March 7, 1933.        E. M. PENDLETON        1,900,760
FOLDING SUPPORT
Filed June 28, 1932
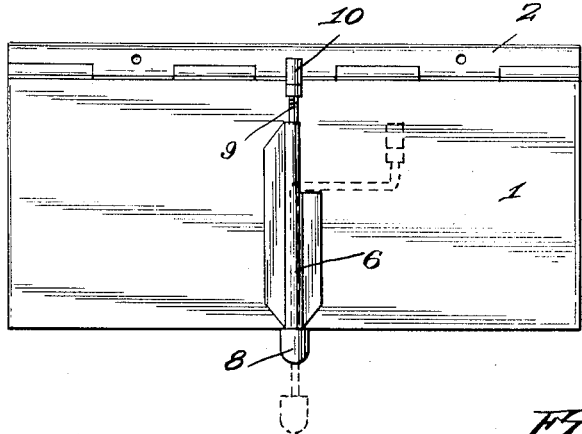
Fig. 1.
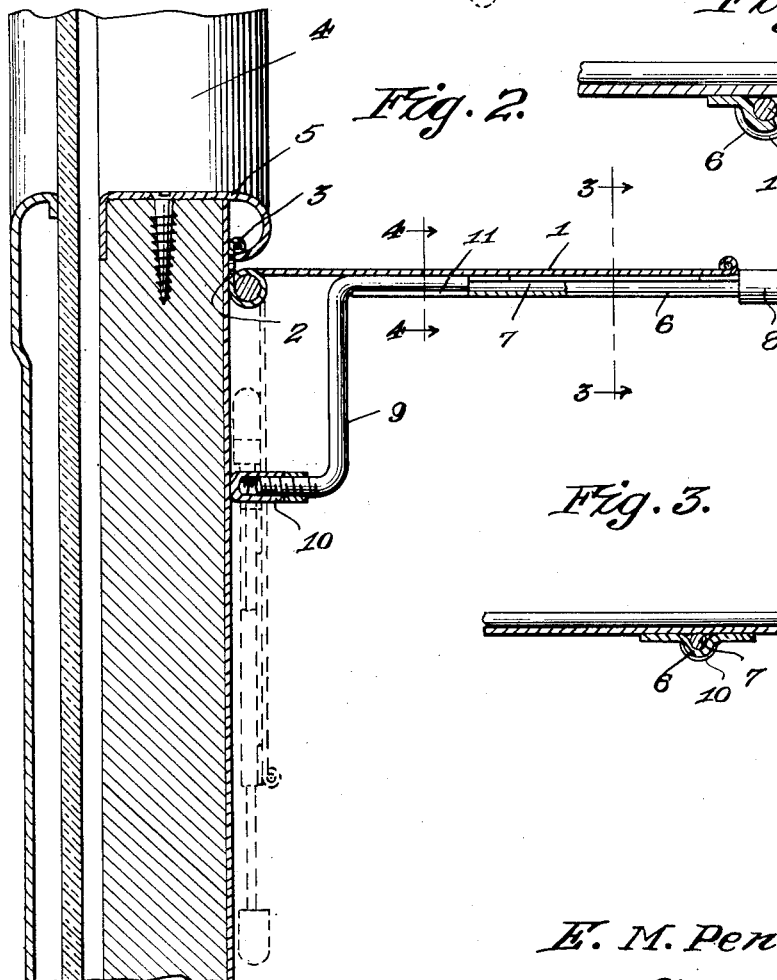
Fig. 2.
Fig. 4.
Fig. 3.
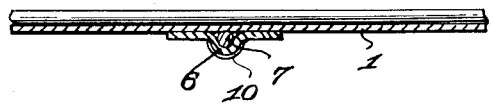
E. M. Pendleton,
INVENTOR
BY Victor J. Evans & Co.
ATTORNEY Patented Mar. 7, 1933

1,900,760

UNITED STATES PATENT OFFICE

ELDRIDGE M. PENDLETON, OF VICKSBURG, MISSISSIPPI

FOLDING SUPPORT

Application filed June 28, 1932. Serial No. 619,792.

This invention relates to shelves or trays especially adapted for automobiles or aeroplanes on which foods and other articles of merchandise may be placed or rested and has for the primary object, the provision of a device of the above stated character which may be easily and quickly installed without the employment of screws or like fasteners and may be folded when not in use so as to conserve space and in no way interfere with the occupants of the automobile or aeroplane.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating a shelf or tray constructed in accordance with my invention.

Figure 2 is a sectional view illustrating a tray or shelf applied to a portion of the body of an aeroplane or automobile.

Figure 3 is a sectional view taken on the line 3—3 of Figure 2.

Figure 4 is a sectional view taken on the line 4—4 of Figure 2.

Referring in detail to the drawing, the numeral 1 indicates a substantially rectangular shaped plate forming the top of a tray or shelf and has hinged along one edge thereof an attaching strip 2, the free edge of which is provided with a beading 3. It is preferable to secure the strip 2 to the body of an automobile or aeroplane adjacent the window as shown at 4 by placing the strip 2 between the wall of the body and one of the finishing strips 5 of the window frame, thereby hingedly connecting the plate to the body of the automobile or aeroplane so that it may occupy either a horizontal or vertical position and when in a vertical position to lie closely against the wall of the body.

A guide 6 is secured to the under face of the plate 1 and has slidably mounted therein a rod 7, one end of which is provided with a finger piece 8 projecting beyond the free edge of the plate 1. A portion of the rod is bent at right angles to form a supporting arm 9. The end of the arm 9 is bent at right angles and screw threaded to receive a bearing element 10 adapted to engage the wall of the body of the automobile or aeroplane for supporting the shelf in a horizontal position. A portion of the guide 6 is slotted as shown at 11 to receive the arm 9 when said rod 7 is turned in one direction for the purpose of supporting the arm against the under face of the plate 1 permitting the latter to swing downwardly against the wall of the body of the automobile or aeroplane.

To place the tray or shelf in use, the plate 1 is swung into a horizontal position and the rod 7 is moved inwardly and turned bringing the bearing portion 10 in engagement with the wall of the body of the automobile or aeroplane thereby firmly supporting the plate horizontally so that the food and other articles of merchandise may be placed thereon.

While I have shown and described the preferred embodiment of my invention, it will be understood that minor changes in construction, combination and arrangement of parts may be made without departing from the spirit and scope of my invention, as claimed.

Having thus described my invention, what I claim is:

1. In combination with a body having a finishing strip, a tray plate having one edge slotted and rolled to provide pintle barrels, a hinged strip having one edge rolled and clamped to the body by the finishing strip and having its opposite edge slotted and rolled to form pintle barrels alining with the first-named pintle barrels, a pintle extending through said barrels and means movably mounted on the plate and adapted to be positioned to engage the body for supporting the plate horizontally.

2. In combination with a body having a finishing strip, a tray plate having one edge slotted and rolled to provide pintle barrels, a hinged strip having one edge rolled and clamped to the body by the finishing strip and having its opposite edge slotted and rolled to form pintle barrels alining with the first-named pintle barrels, a pintle extending through said barrels, a guide carried by said plate, a rod slidable in said guide and having an angularly bent portion to form a brace engageable with the body when in one position to support the plate horizontally, said guide having a slot adapted to permit sliding movement of the rod and the brace to position the latter against the under face of the plate, allowing said plate to swing downwardly against the body.

In testimony whereof I affix my signature.

ELDRIDGE M. PENDLETON.